C. VAN DEVENTER.
MOTION PICTURE CAMERA.
APPLICATION FILED MAY 17, 1915.

1,162,419.

Patented Nov. 30, 1915.

Witnesses
Martin H. Olsen
F. M. Reichel

Inventor
Christopher Van Deventer
By Geo. E. Waldo
Atty.

UNITED STATES PATENT OFFICE.

CHRISTOPHER VAN DEVENTER, OF CHICAGO, ILLINOIS.

MOTION-PICTURE CAMERA.

1,162,419.  Specification of Letters Patent.  Patented Nov. 30, 1915.

Application filed May 17, 1915. Serial No. 28,627.

*To all whom it may concern:*

Be it known that I, CHRISTOPHER VAN DEVENTER, a citizen of the United States, and a resident of Chicago, in the county of Cook and State of Illinois, have invented certain new and useful Improvements in Motion-Picture Cameras, of which the following is a specification.

This invention relates to motion picture cameras and relates particularly to devices for discharging static electricity from the films used in such cameras.

As is well known to motion picture producers, the friction to which the celluloid films are subjected in the operation of the camera, generates static electricity, which accumulates on said films and, whenever said films come into sufficiently close proximity to an electrical conductor, discharges from said films to said conductor, such discharge in many cases producing sparks or flashes which operate to expose the sensitized films, producing what may be described as lace work patterns thereon, which obscure and in many cases practically obliterate the portions of the picture which register therewith, thus often very seriously impairing the pictures and in many cases rendering them absolutely worthless. It is a well known fact, that many reels of film are destroyed in this manner, resulting not only in the loss of the films themselves, but in the loss of the camera operator's time and, in the case of photo plays, in the loss of the actor's time as well. Moreover, defects in the films arising from this cause, cannot be detected until the entire film is exposed and has been developed and often not until the pictures are projected, thus rendering it necessary to reproduce the entire reel.

The object of the present invention is to provide means for discharging the static electricity, which accumulates on photographic films in the operation of motion picture cameras, but without sparking or flashing, so that the films will be uneffected thereby. To this end, a discharging device of my invention comprises the various features, combinations of features and details of construction hereinafter described and claimed.

Figure 1:
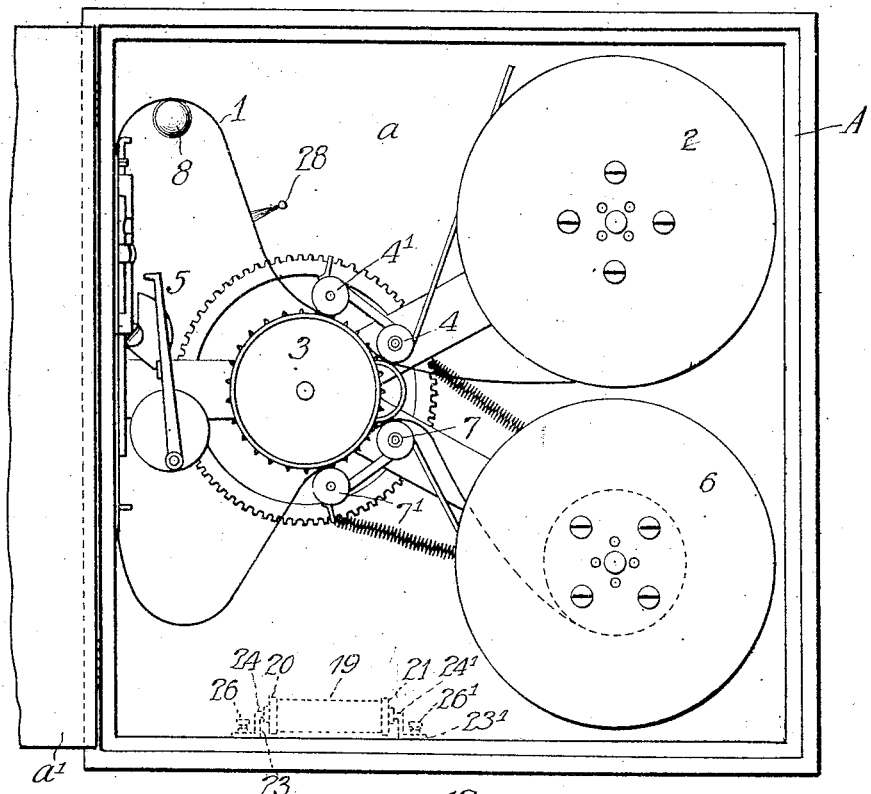
Figure 2:
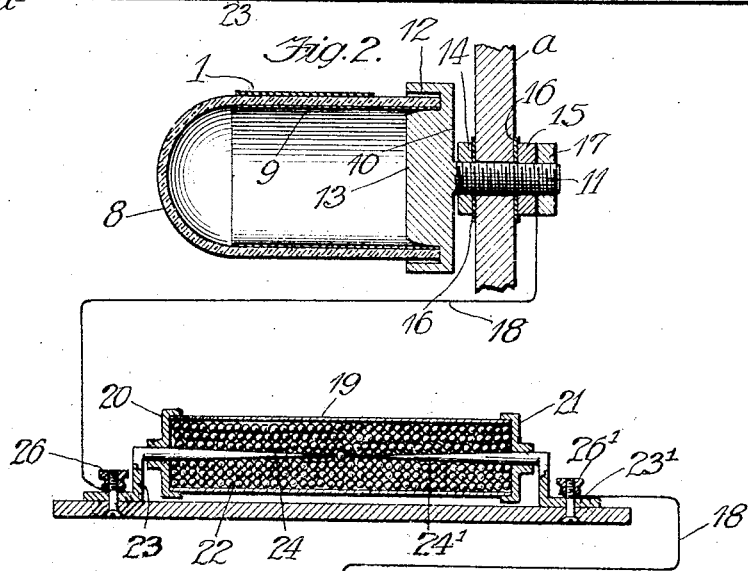

In the accompanying drawing, in which my invention is fully illustrated, Figure 1 is a side view of motion picture camera equipped with my improved device for discharging the static electricity from the films, the door of said camera being open to expose the film feed mechanism and the relation of my improved discharging device relative thereto; and Fig. 2 is an enlarged sectional view of the accumulator and of the discharging device, showing in the diagram the ground connections.

For purposes of illustration, I have in the drawings, shown my improved device applied to a well known type of camera, which, as regards its usual features, may be of any usual or approved construction and will be readily understood by persons familiar with the art from an inspection of the drawings without a detailed description thereof.

For purposes of convenient reference, I have designated different parts of the camera as follows:

A designates the camera casing which is divided longitudinally into separate compartments by a partition $a$, one of which, designed for containing the film reels and the operating mechanism, is exposed in the drawing, the side of said compartment being open and being adapted to be closed by a door $a'$.

1 designates the film. The unexposed film is wound upon a spool or reel 2 from which it is drawn by a sprocket wheel 3 which is adapted to be rotated by a crank or the like, not shown, said film being maintained in operative engagement with the sprocket wheel 3 by rollers 4, 4', of which the roller 4 is rotatably mounted on a fixed stud and the roller 4' on a stud which is movable toward and from the face of said sprocket wheel and is held yieldingly in contact therewith.

5 designates, as a whole, the feed mechanism whereby the film is fed past the light opening of the camera with a step by step movement.

6 is a receiving spool on which the film 1 is wound after being exposed. Rotation is adapted to be imparted to the spool or reel 6 by means of a suitable friction drive, whereby said spool will maintain a slight tension upon the film and wind it upon said spool with desired tightness. Between the step by step feed mechanism 5 and the spool or reel 6, the film 1 engages the feed sprocket wheel 3 so as to be fed thereby at the same rate that said film is drawn from the spool or reel 2, being held in operative engagement with said sprocket wheel by idle rollers, comprising a roller 7 rotatably mounted on a fixed stud, and a roller 7' mounted on a movably supported stud so as to be movable toward and from said sprocket wheel and held yieldingly in contact with the face thereof, said rollers 7, 7', being substantially identical with the rollers 4, 4'. Said sprocket wheel 3 and rollers 7, 7' will sustain the pull or tension to which the film is subjected by the spool or reel 6, which might otherwise impair the operation of the feed mechanism 5, and result in an imperfect or defective exposure.

Supported within the compartment of the camera casing A which contains the film reels and feed mechanism, just described, and in such position that the film 1 will pass over and in contact with the same, preferably before it is exposed, is a plate 8 of vitreous material, preferably thin glass. Said plate is preferably rounded so that the film 1 will not catch thereon and be torn thereby in passing over the same. Secured to opposite side of said plate from that with which the film 1 contacts, is a suitable conductor 9, preferably tin foil, which is provided with a ground connection, presently to be described.

In the preferable construction shown, the plate 8, is made in the form of a hollow tube or cylinder, the film 1 passing over and contacting with the outer surface thereof and the conductor 9 being secured to the inner surface thereof. The outer end of the tube 8 is preferably closed and, as shown, said tube is supported within the camera casing in the following manner:—Said tube is mounted on a stud comprising a head 10 and a screw threaded shank 11. Said stud being made of brass or other electrical conductor. Formed in the head of said stud is a groove 12 adapted to receive the open end of said tube 8, the portion of said stud within said groove forming a plug 13 which fits the open end of said tube 8 so that it will be in close electrical contact with the conductor 9 secured to the inner surface of said tube. Also, particularly where the conductor 9 consists of tin foil which is easily torn, said plug 13 is preferably made slightly smaller at its outer end than at its base, the sides thereof being preferably slightly rounded. The large diameter of said groove 12 is preferably slightly larger than the outside diameter of the base of the tube 8, said tube being secured in said groove by cement inserted into the space between said tube and the outer side of said tube. As shown, said stud with the tube 8 secured thereto is supported in the following manner:—The shank 11 of said stud is inserted through a hole in the partition a of the camera casing and threaded to said shank on opposite sides of said partition are clamping nuts 14 and 15 which are adapted to be turned into close engagement with opposite sides of said partition a. Said clamping nuts 14 and 15 afford convenient means for adjusting the tube 8 bodily toward and from said partition a to bring the same in desired operative relation to the film 1, said relation being such, preferably, that said film will pass at a sufficient distance from the end of the section of the head 10 of the supporting stud which extends outside of the tube 8, to insure against a direct discharge of the static electricity from said film 1 to said supporting stud, with probably attendant sparking and flashing and consequent exposure and injury to said film. To prevent light from entering the compartment of the camera casing, which contains the film 1, through the hole in which the shank 11 of said stud is secured, washers 16, of felt or similar material, are inserted between the nuts 14 and 15 and the sides of the partition a. Also threaded to the shank 11 of said supporting stud and coöperating with the clamping nut 15 is a binding nut 17 adapted for electrically connecting the grounded conductor to the shank of said stud and through it to the conductor 9 on the inner surface of the tube 8. As shown, said grounded conductor comprises two sections 18, 18', interposed between which and electrically connected thereto is a diffusing device. While my invention contemplates the use of any desired or approved form of diffusing device, I prefer the form shown in the drawings, see particularly Fig. 2, which consists of a glass tube 19 the ends of which are closed by heads or caps 20 and 21 and which is practically entirely filled with relatively fine shot 22. Said shot, by contact with each other will form a multiplicity of continuous electrical circuits or connections through said tube, which the electrical discharge from the section 18 of the conductor to the section 18' thereof may follow.

The tube 19 is supported by brackets 23, 23' secured to the bottom or side of the compartment of the camera casing A on the side of the partition a opposite to the compartment in which the tube 8 is mounted. Formed at the upper ends of said brackets 23, 23', respectively, are arms 24, 24' which extend through holes formed in the heads 20, 21, of said tube 19. Said arms 24, 24' extend to within a short distance, say one eighth of an inch, of each other and terminate in sharp points, as clearly shown in the drawing. As preferably constructed, the arms 24, 24' are brazed to the heads 20 and 21, whereby said diffuser will form a unitary structure. With the described construction, an accumulated charge of electricity of even very low potential will flow freely through the electrical circuits or connections formed by the shot, which are continuous, the most probable line of discharge being across the gap or space which separates the adjacent pointed ends of the arms 24, 24′, which gap or space is bridged by the shot which surround said points and fill the space between same, thus greatly reducing the resistance to the electrical discharge or flow.

The bracket 23 is electrically connected with the section 18 of the discharge conductor and the bracket 23′ with the section 18′ of said discharge conductor, said brackets being provided with usual binding posts and nuts 26 for making said connections. Said conductor section 18′ is grounded as indicated at 27. My invention, however, contemplates equally a direct ground connection for the stud which supports the tube 8, if desired.

My improved device operates on the familiar principle of discharging the electricity from the film 1 by induction and I have discovered that it operates most effectively with a charge of higher potential than is produced in the ordinary operation of the camera. I accordingly provide means for thus increasing the potential of said electrical charge. Simple means for this purpose consists of a camel's hair brush or the like, shown at 28, mounted within the camera casing with the hairs thereof in contact with the film 1. The friction of said brush on said film will operate, in a familiar manner, to generate electricity which will accumulate on said film and increase the potential of the electrical charge thereon, in the manner desired. Said brush 28 will also operate to remove dust and the like from the film and thus keep it clean.

In addition to its described use in connection with a motion picture camera, it is believed that my improved device for discharging static electricity by induction may be employed with highly advantageous results in motion picture projecting machines and for many other purposes. I do not, therefore, desire to limit myself to the particular application shown, but to include all possible applications thereof.

I claim:—

1. A motion picture camera and means for discharging static electricity from a film therein, comprising an electrical conductor supported in such relation to said film that a static electrical charge on said film will induce an electrical charge on said conductor and a ground connection for said conductor, substantially as described.

2. A motion picture camera and means for discharging static electricity from a film therein, comprising an electrical conductor supported in such relation to said film that a static electrical charge on said film will induce an electrical charge on said conductor, a diffuser and electrical connections from said conductor to said diffuser and from said diffuser to ground, substantially as described.

3. A motion picture camera and means for discharging static electricity from a film therein, comprising an electrical conductor supported in such relation to said film that a static electrical charge on said film will induce an electrical charge on said conductor, a diffuser comprising a tube of non-conducting material, conductor points which extend into said tube, one of said points being electrically connected with said conductor and the other being electrically connected to ground, and shot contained in the tube of said diffuser which surrounds said conductor points and form a continuous body from end to end of said tube, substantially as described.

4. A motion picture camera and means for discharging static electricity from a film therein, comprising an electrical conductor supported in such relation to said film that a static electrical charge on said film will induce an electrical charge on said conductor, a diffuser comprising a tube of non-conducting material, conductor points which extend into said tube, one of said points being electrically connected with said conductor and the other being electrically connected to ground, and shot contained in the tube of said diffuser which substantially fill said tube and surrounds the conductor points therein, substantially as described.

5. A motion picture camera and means for discharging static electricity from a film therein, comprising an electrical conductor supported in such relation to said film that a static electrical charge on said film will induce an electrical charge on said conductor, means for generating a charge of static electricity on said film, and a ground connection for said conductor, substantially as described.

6. A motion picture camera and means for discharging static electricity from a film therein, comprising an electrical conductor supported in such relation to said film that a static electrical charge on said film will induce an electrical charge on said conductor, means for generating a charge of static electricity on said film, said means comprising a brush supported so that the filaments thereof will contact with said film, and a ground connection for said conductor, substantially as described.

7. A motion picture camera and means for discharging static electricity from a film therein, comprising an electrical conductor supported in said relation to said film that a static electrical charge on said film will induce an electrical charge on said conductor, means for generating a charge of static electricity on said film, and a diffuser in electrical circuit with said conductor and to ground, substantially as described.

8. A motion picture camera and means for discharging static electricity from a film therein, comprising a glass plate or its equivalent over which said film passes, an electrical conductor on the opposite side of said plate from said film and a ground connection for said conductor, substantially as described.

9. A motion picture camera and means for discharging static electricity from a film therein, comprising a glass tube or its equivalent over which said film passes, an electrical conductor within said tube and a ground connection for said conductor, substantially as described.

10. A motion picture camera and means for discharging static electricity from a film therein, comprising a glass tube or its equivalent over which said film passes, an electrical conductor secured to the inner surface of said tube opposite said film, a stud which is a conductor of electricity on which said tube is supported, and which contacts with the conductor inside of said tube, a shank on said stud which extends through a hole in a part of the camera casing and clamping nuts threaded to said shank on opposite sides of said wall, and a grounded connection to said stud, substantially as described.

11. A motion picture camera and means for discharging static electricity from a film therein, comprising a glass tube or its equivalent over which said film passes, an electrical conductor secured to the inner surface of said tube opposite said film, a stud which is a conductor of electricity, comprising a head and a shank, said shank extending through a hole formed in a wall of the camera casing and clamping nuts threaded thereto on opposite sides of said wall, the head of said stud being provided with a groove in which said glass tube is secured, the portion of the head of said stud within said groove forming a plug which extends into the end of said tube and which contacts with the conductor secured in said tube, and a ground connection for said conductor, substantially as described.

12. Means for discharging static electricity from an object moving in a continuous path, comprising an electrical conductor insulated with respect to said moving object and supported in such relation thereto that a static charge on said object will induce an electrical charge on said conductor, and a ground connection for said conductor, substantially as described.

13. Means for discharging static electricity from an object moving in a continuous path, comprising an electrical conductor insulated with respect to said moving object and supported in such relation thereto that a static charge on said object will induce an electrical charge on said conductor, a diffuser and electrical connections from said conductor to said diffuser and from said diffuser to ground, substantially as described.

14. Means for discharging static electricity from an object moving in a continuous path, comprising a glass plate or its equivalent over which said moving object passes, an electrical conductor on the opposite side of said plate from said moving object and a ground connection for said conductor, the relation being such that a static charge on said object will induce an electrical charge on said conductor, substantially as described.

15. Means for discharging static electricity from an object moving in a continuous path, comprising a glass tube or its equivalent over which said moving object passes, an electrical conductor within said tube and a ground connection for said conductor, the relation being such that a static charge on said object will induce an electrical charge on said conductor, substantially as described.

In testimony that I claim the foregoing as my invention, I affix my signature in the presence of two subscribing witnesses this 14th day of May, 1915.

CHRISTOPHER VAN DEVENTER.

Witnesses:
ALEX. D. KING, Jr.,
F. M. REICHEL.